(12) United States Patent
Lee et al.

(10) Patent No.: US 11,586,559 B2
(45) Date of Patent: Feb. 21, 2023

(54) STORAGE DEVICE, NONVOLATILE MEMORY SYSTEM INCLUDING MEMORY CONTROLLER, AND OPERATING METHOD OF THE STORAGE DEVICE FOR INDEPENDENTLY PERFORMING A RELINK TO A HOST DEVICE

(71) Applicant: Samsung Electronics Co., Ltd., Suwon-si (KR)

(72) Inventors: Hwasoo Lee, Suwon-si (KR); Mingon Shin, Uiwang-si (KR); Seungjae Lee, Hwaseong-si (KR); Myeongjong Ju, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 101 days.

(21) Appl. No.: 17/026,714

(22) Filed: Sep. 21, 2020

(65) Prior Publication Data

US 2021/0165747 A1 Jun. 3, 2021

(30) Foreign Application Priority Data

Dec. 3, 2019 (KR) ........................ 10-2019-0159366

(51) Int. Cl.
| | | |
|---|---|---|
| G06F 12/14 | (2006.01) | |
| G06F 12/02 | (2006.01) | |
| G06F 13/40 | (2006.01) | |
| G06F 13/42 | (2006.01) | |
| G06F 21/31 | (2013.01) | |
| G06F 21/79 | (2013.01) | |

(52) U.S. Cl.
CPC ...... *G06F 12/1408* (2013.01); *G06F 12/0246* (2013.01); *G06F 13/409* (2013.01);
(Continued)

(58) Field of Classification Search
CPC ............ G06F 12/0246; G06F 12/1408; G06F 13/4068; G06F 13/409; G06F 13/4221;
(Continued)

(56) References Cited

U.S. PATENT DOCUMENTS 5,974,486 A * 10/1999 Siddappa ............. G06F 13/385
710/52
7,062,602 B1 * 6/2006 Moore .................... G06F 16/10
711/111
(Continued)

FOREIGN PATENT DOCUMENTS

KR 1020190056951 A 5/2019
WO 2009130538 A2 10/2009

OTHER PUBLICATIONS

Extended European Search Report, dated Apr. 29, 2021, for corresponding European Patent Application No. EP 20211710.7 (8 pages).

*Primary Examiner* — Eric T Oberly
(74) *Attorney, Agent, or Firm* — Muir Patent Law, PLLC

(57) ABSTRACT

A nonvolatile memory system is disclosed. The nonvolatile memory system includes a host device and a storage device connected to the host device through a physical cable including a power line and a data line. The storage device includes: a nonvolatile memory; a link controller configured to temporarily deactivate the data line while supplying power from the host device through the power line; and a memory controller including a user verification circuit configured to authenticate a user of the storage device and change a state of the memory controller according to a verification result, a relink trigger circuit configured to control the link controller based on the state change of the memory controller, and a data processing circuit configured to encrypt and decrypt data.

17 Claims, 12 Drawing Sheets

(52) U.S. Cl.
CPC ...... *G06F 13/4068* (2013.01); *G06F 13/4221* (2013.01); *G06F 21/31* (2013.01); *G06F 21/79* (2013.01); *G06F 2213/0032* (2013.01)

(58) Field of Classification Search
CPC ... G06F 21/31; G06F 21/79; G06F 2213/0032
See application file for complete search history.

(56) References Cited

U.S. PATENT DOCUMENTS

| | | |
|---|---|---|
| 7,721,016 B2 | 5/2010 | Xie et al. |
| 8,001,304 B2 | 8/2011 | Yung et al. |
| 8,775,760 B2 | 7/2014 | Chu |
| 8,812,769 B2 | 8/2014 | Bryant-Rich et al. |
| 8,843,664 B2 | 9/2014 | Bajpai et al. |
| 9,405,939 B2 | 8/2016 | Ford et al. |
| 10,203,896 B2 | 2/2019 | Yoon et al. |
| 10,318,463 B2 | 6/2019 | Kuo et al. |
| 2003/0054703 A1* | 3/2003 | Fischer ................ H02J 7/0042 439/894 |
| 2004/0088513 A1* | 5/2004 | Biessener ............... G06F 21/85 711/173 |
| 2006/0204047 A1 | 9/2006 | Dave et al. |
| 2016/0048459 A1* | 2/2016 | Oh .......................... G06F 21/79 711/103 |
| 2017/0230179 A1* | 8/2017 | Mannan ................ H04L 9/3226 |
| 2019/0007203 A1* | 1/2019 | Bolotin ................ G06F 21/602 |
| 2019/0155777 A1 | 5/2019 | Shim |

\* cited by examiner

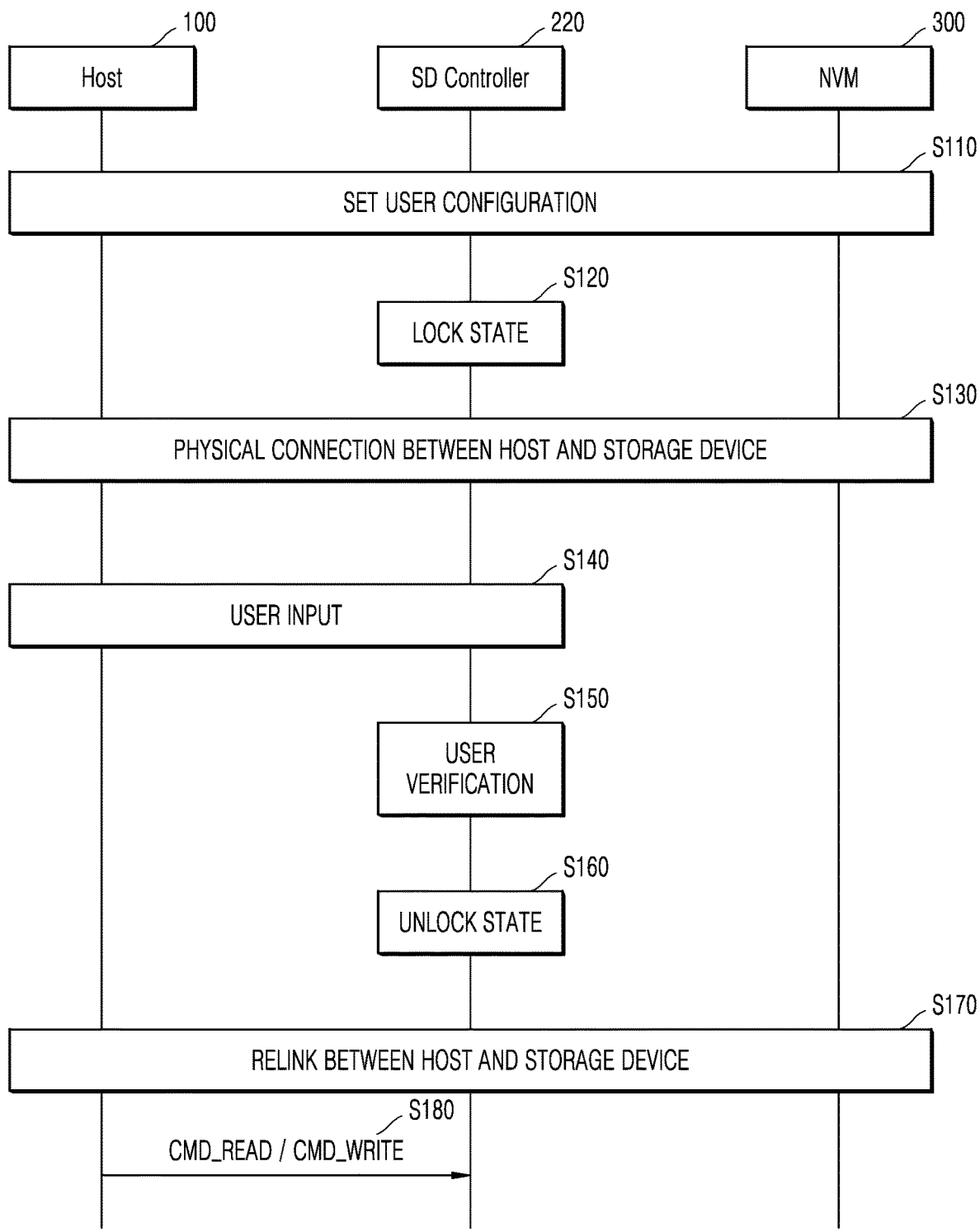

STORAGE DEVICE, NONVOLATILE MEMORY SYSTEM INCLUDING MEMORY CONTROLLER, AND OPERATING METHOD OF THE STORAGE DEVICE FOR INDEPENDENTLY PERFORMING A RELINK TO A HOST DEVICE

CROSS-REFERENCE TO RELATED APPLICATION

This application claims the benefit of priority under 35 U.S.C. § 119 to Korean Patent Application No. 10-2019-0159366, filed on Dec. 3, 2019, in the Korean Intellectual Property Office, the disclosure of which is incorporated herein in its entirety by reference.

BACKGROUND

The inventive concept relates to a semiconductor memory, and more particularly, to a storage device, a nonvolatile memory system including a memory controller, and an operating method of the storage device.

Semiconductor memory devices may be classified into volatile memory devices, which lose stored data when the supply of power is terminated, and nonvolatile memory devices, which do not lose stored data when the supply of power is terminated. A read and write speed of volatile memory devices is fast, but when external power is not supplied to the volatile memory devices, stored content disappears. On the other hand, nonvolatile memory devices have a read and write speed less than that of the volatile memory devices, however, content therein is preserved even when external power is not supplied to the nonvolatile memory devices.

Flash memory is a nonvolatile memory device used in various fields due to its high operating speed, low power consumption, low noise, and high capacity through stacking. According to the increased use of flash memory, demand for security techniques for flash memory has increased.

A self encrypting drive (SED), one of the security techniques used for flash memory, may provide a high security function by encrypting data to write the encrypted data and decrypting the encrypted data to read the data.

However, a storage device supporting SED is a passive device and may operate according to a command of a host device, and thus, when the host device does not support SED, the storage device may not operate independently. Therefore, there is a need for a storage device capable of operating in various host devices.

SUMMARY

The inventive concept provides a storage device, a memory controller, a nonvolatile memory system including the memory controller, an operating method of the storage device, and an apparatus and method for independently performing a relink to a host device.

According to an embodiment of the inventive concept, there is provided a nonvolatile memory system including a host device and a storage device connected to the host device through a physical cable including a power line and a data line, the storage device including: a nonvolatile memory; a link controller configured to temporarily deactivate the data line while supplying power from the host device through the power line; and a memory controller including a user verification circuit configured to verify a user of the storage device and change a state of the memory controller according to a verification result, a relink trigger circuit configured to control the link controller based on the state change of the memory controller, and a data processing circuit configured to encrypt and decrypt data.

According to another embodiment of the inventive concept, there is provided a storage device including: a nonvolatile memory; a user input receiving circuit; a link controller configured to deactivate a data line through which the storage device is physically connected to a host device; and a memory controller configured to perform user verification by comparing a pre-stored user input value with a user input value received from the host device or the user input receiving circuit, change a state of the memory controller based on a user verification result, and transmit, based on the state change of the memory controller, a trigger signal indicating that the data line is temporarily deactivated to the link controller.

According to another embodiment of the inventive concept, there is provided an operating method of a storage device including a nonvolatile memory, a link controller, and a memory controller, the operating method including: detecting a physical connection to a host device; receiving a user input from the host device or a user input receiving circuit in the storage device; performing user verification based on the received user input; changing a state of the memory controller to an unlock state when the user verification is successful; and performing a relink to the host device in response to the change to the unlock state.

BRIEF DESCRIPTION OF THE DRAWINGS

Embodiments of the inventive concept will be more clearly understood from the following detailed description taken in conjunction with the accompanying drawings in which:

FIG. 2 is a signaling diagram of a nonvolatile memory system, according to an example embodiment of the inventive concept;

DETAILED DESCRIPTION OF THE EMBODIMENTS

Figure 1A:
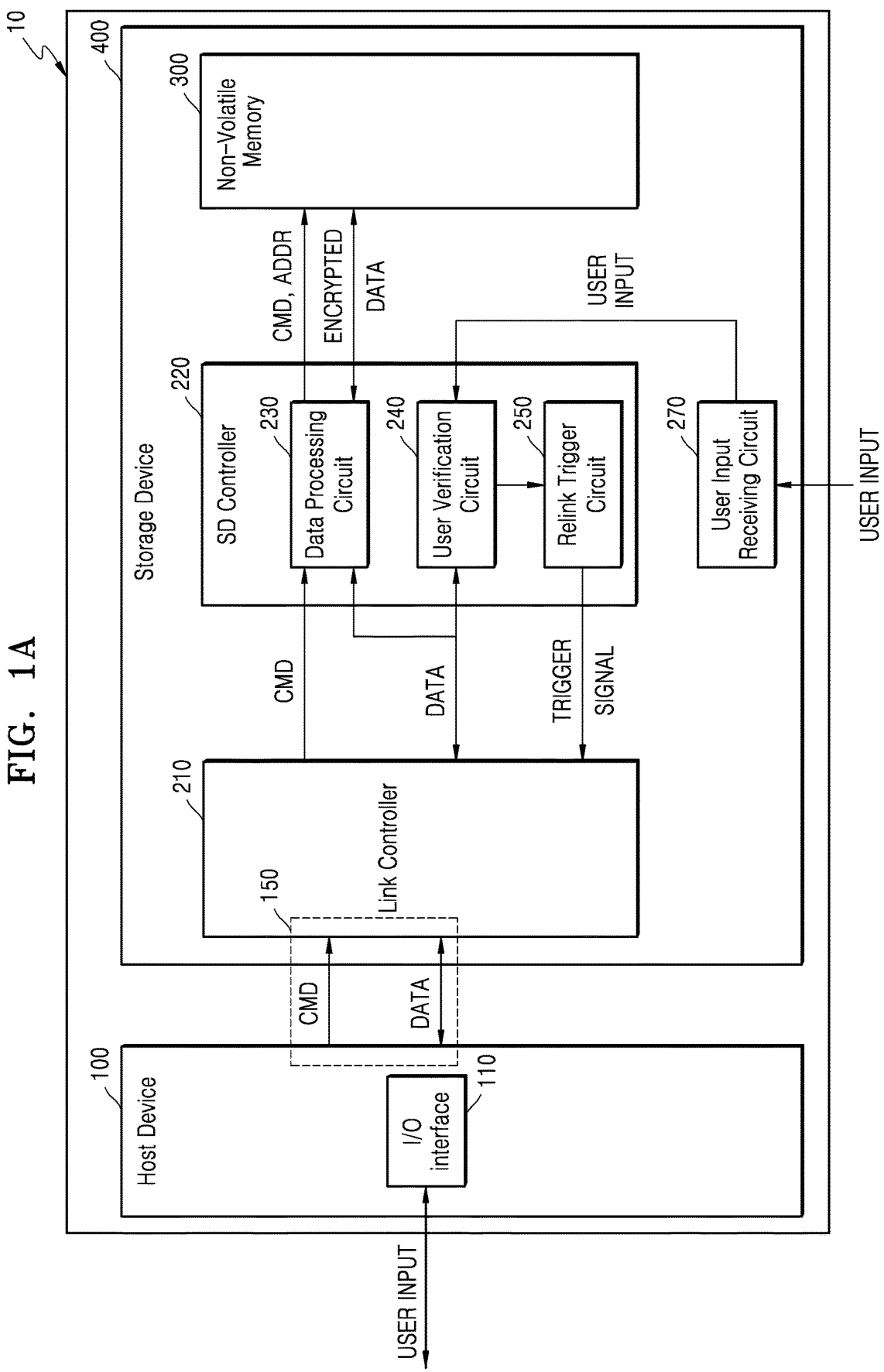
FIG. 1A is a block diagram of a nonvolatile memory system, according to an example embodiment of the inventive concept.

Hereinafter, embodiments of the inventive concept will be described in detail with reference to the accompanying drawings. In the drawings, like numbers refer to like elements throughout.

FIG. 1A is a block diagram of a nonvolatile memory system according to an example embodiment of the inventive concept. FIG. 1A shows a nonvolatile memory system 10. The nonvolatile memory system 10 may include a host device 100 and a storage device 400. In some embodiments, the host device 100 may be connected to the storage device 400 through a physical cable including a power line and a data line. The physical cable may comprise a cable for a hot-pluggable interface, such as interface 150.

The storage device 400 may comprise a link controller 210, a storage device controller (hereinafter, SD controller or memory controller) 220, and a nonvolatile memory 300.

The host device 100 may be implemented by an electronic device, for example, a personal computer (PC), a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, or the like. Alternatively, the host device 100 may be implemented by an electronic device such as a wearable device, for example, a wristwatch or a head-mounted display (HMD).

According to example embodiments of the inventive concept, the host device 100 may include an interface 150 configured to transmit and receive a command CMD and/or data DATA to and/or from the storage device 400. The interface 150 may include at least one hot-pluggable interface. For example, the interface 150 may include an interface protocol such as peripheral component interconnect-express (PCI-E), advanced technology attachment (ATA), serial ATA (SATA), parallel ATA (PATA), or serial attached small computer system interface (SCSI) (SAS). In addition, various interface protocols such as universal serial bus (USB), multi-media card (MMC), enhanced small disk interface (ESDI), integrated drive electronics (IDE), and thunderbolt may be applied.

According to example embodiments of the inventive concept, the storage device 400 may store and output data. The storage device 400 may be an internal memory embedded in an electronic device. For example, the storage device 400 may be an embedded universal flash storage (UFS) memory device, an embedded multi-media card (eMMC), or a solid state drive (SSD). The storage device 400 may be embedded on the same semiconductor substrate as the host device 100. According to example embodiments of the inventive concept, the storage device 400 may be an external memory attachable to and detachable from an electronic device. For example, the storage device 400 may include at least one of a UFS memory card, a compact flash (CF) card, a secure digital (SD) card, a micro secure digital (Micro-SD) card, a mini secure digital (Mini-SD) card, an extreme digital (xD) card, or a memory stick.

According to example embodiments of the inventive concept, the link controller 210 may control a link (or connection) between the storage device 400 and the host device 100. In some embodiments, the link controller 210 and the SD controller 220 may be on the same semiconductor substrate. When the link controller 210 is implemented to include a separate configuration distinct from the SD controller 220, it may be referred to as a bridge board. The controllable link may refer to activating or deactivating a data path for data transmission and reception while receiving power through a power line. For example, the link controller 210 may deactivate a pin to which the data path is connected, while maintaining a connection with the host device 100 through a USB cable. For example, the deactivation or disabling of the pin corresponding to the data path, while the storage device 400 receives power from the host device 100, may cause the host device 100 to identify that the host device 100 is disconnected from the storage device 400, due to the deactivation of the pin corresponding to the data path, although the host device 100 is physically connected to the storage device 400 through the USB cable. Thereafter, when the link controller 210 activates (or enables) the pin corresponding to the data path again, the host device 100 identifies the storage device 400 again. For example, the link controller 210 may re-identify the storage device 400 by re-activating the pin corresponding to the data path. In some embodiments, the link controller 210 may include a switch (not shown) on the data path, and the link controller 210 may control a link by controlling the switch. As another example, the link controller 210 may include a microcontroller (not shown). The link controller 210 may reset or initialize the microcontroller to both receive power and temporarily deactivate the data path. Accordingly, even though plug-out (unplugging) or physical disconnect does not actually occur between the host device 100 and the storage device 400, relink between the host device 100 and the storage device 400 may be performed.

According to example embodiments of the inventive concept, the SD controller 220 may include a data processing circuit 230, a user verification circuit 240, a relink trigger circuit 250, and a user input receiving circuit 270.

The data processing circuit 230 may provide various signals to the nonvolatile memory 300 and control operations such as, for example, write and read operations. For example, the SD controller 220 may access data stored in a memory cell array by providing the command CMD and an address ADDR to the nonvolatile memory 300.

As another example, the data processing circuit 230 may encrypt data and store the encrypted data in the memory cell array, or the data processing circuit 230 may decrypt encrypted data stored in the memory cell array and output the decrypted data as read data. Because encryption and decryption are performed in the processes of data storage and data output, even when the storage device 400 is stolen or lost, it may be possible to prevent leakage of stored data.

The user verification circuit 240 may determine whether a user is an authorized user of the storage device 400. The user verification circuit 240 may receive a password through the host device 100 or the user input receiving circuit 270 included in the storage device 400.

For example, when the storage device 400 is encrypted, the user of the storage device 400 may access a user data region only when the user passes a user verification (or authentication). Therefore, the user may input the password through the host device 100 or the user input receiving circuit 270 of the storage device 400. The password may be referred to as a user input. The user input may be included in at least one of the data DATA received by the storage device 400 from the host device 100 or in data delivered from the user input receiving circuit 270 to the user verification circuit 240. The user verification circuit 240 may determine whether the user is the authorized user of the storage device 400 by comparing the user input received through the host device 100 and the link controller 210 or received from the user input receiving circuit 270 to a pre-stored password. When the comparison result is mismatch, a lock state of the storage device is maintained, and thus, user data may be protected. When the comparison result is match, the storage device is changed to an unlock state, and an access to the user data may be enabled.

The relink trigger circuit 250 may transmit a trigger signal to the link controller 210. The trigger signal may be a signal for controlling the link controller 210 such that the link controller 210 performs a relink (or reconnection). For example, in response to receiving the trigger signal, the link controller 210 may deactivate the pin corresponding to the data path, deactivate the switch on the data path, or initialize the microcontroller included in the link controller 210.

According to example embodiments of the inventive concept, the relink trigger circuit 250 may transmit the trigger signal to the link controller 210 at least based on a state of the SD controller 220. For example, when the SD controller 220 transitions from the lock state to the unlock state, the relink trigger circuit 250 may transmit the trigger signal to the link controller 210.

The user input receiving circuit 270 may receive the user input. The user input may include a password or data for a password that may be used for changing a state of the SD controller 220 from the lock state to the unlock state. The user input receiving circuit 270 may receive the user input and deliver the user input to the user verification circuit 240. The user verification circuit 240 may perform user verification by comparing the received user input to the pre-stored password.

According to an example embodiment of the inventive concept, the user input receiving circuit 270 may be implemented by various devices. For example, the user input receiving circuit 270 may be implemented by a dial device or a keypad. In some embodiments, the user input receiving circuit 270 may include a dial or a jog dial configured to input a plurality of numbers. The user of the storage device 400 may input the same number as a pre-set password by manipulating the dial or the jog dial or touching or pushing numbers on the keypad.

According to another example embodiment of the inventive concept, the user input receiving circuit 270 may be implemented by a radio frequency identification (RFID) module. The RFID module may be a module configured to exchange data between an RFID tag device and an RFID reader by using a radio frequency. According to example embodiments of the inventive concept, the RFID module may be implemented by a near field communication (NFC) module and/or a magnetic security transfer (MST) module. For example, the user may have an external device (not shown) separated from the host device 100. The external device may be able to perform biometrics and may include a device such as a smartphone capable of performing wireless communication. The external device may transmit user verification data to the user input receiving circuit 270 through the NFC module or the MST module in response to the success of the user verification. In this case, the external device may be manipulated by the user so that the external device is located within a pre-defined distance from the storage device 400.

According to another example embodiment of the inventive concept, the user input receiving circuit 270 may compare biometric data pre-stored in a biometrics module to input biometric data. Herein, the biometric data may be data used to identify or verify an individual based on a physical feature of a human being. For example, the biometric data may include various data including fingerprint data, iris data, vein data, voice data, retina data, and the like. According to the example embodiments described above, the user may unlock the storage device without inputting the password through the host device 100.

Figure 1B:
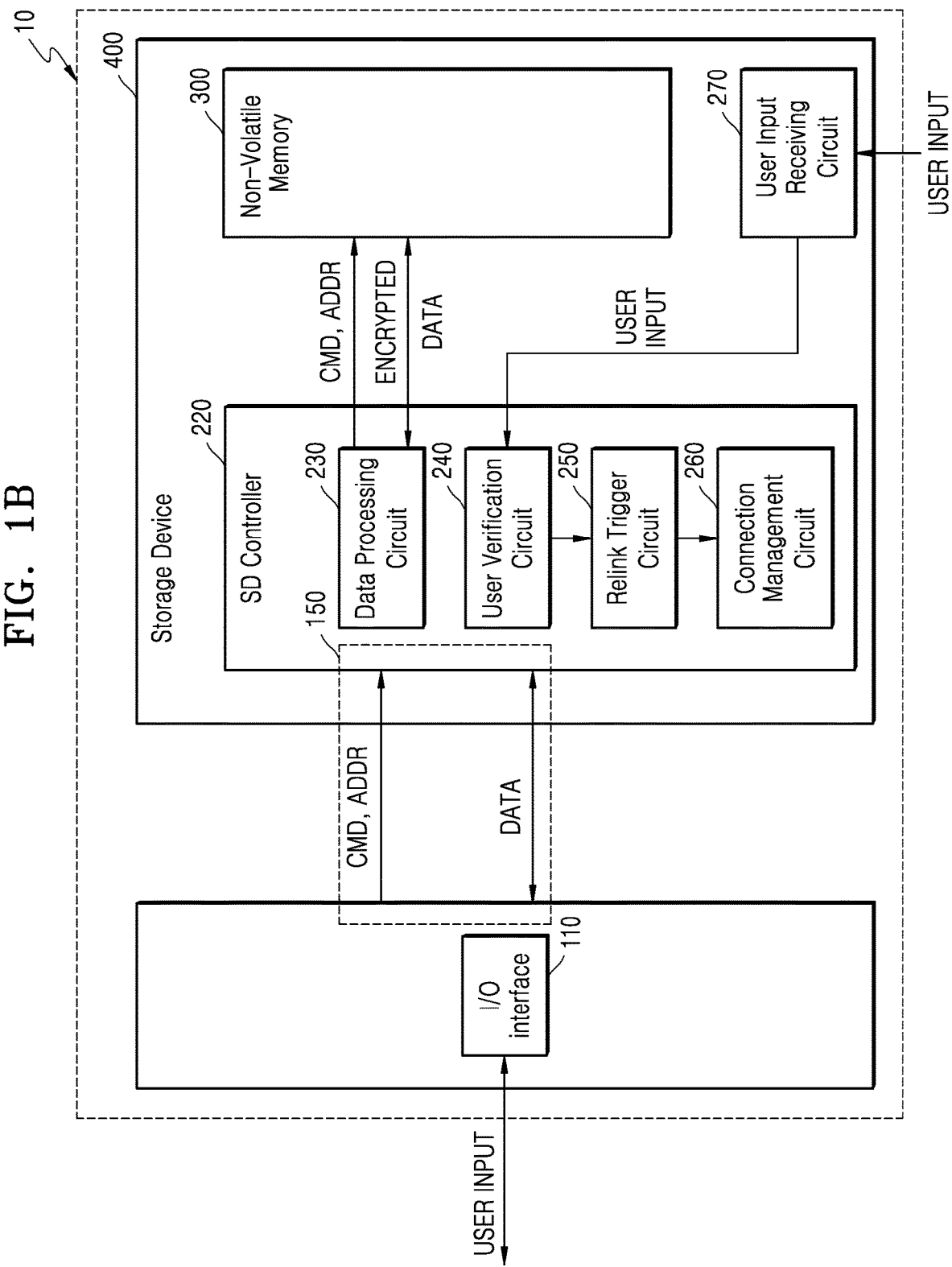
FIG. 1B is a block diagram of a nonvolatile memory system, according to an example embodiment of the inventive concept.

FIG. 1B is a block diagram of a nonvolatile memory system according to an example embodiment of the inventive concept. The descriptions made with reference to FIG. 1A may not be repeated herein.

Referring to FIGS. 1A and 1B, the SD controller 220 may further include a connection management circuit 260. Although FIG. 1A shows that the link controller 210 and the SD controller 220 are separated controllers distinguishable from each other, the present embodiment is not limited thereto.

According to example embodiments of the inventive concept, referring to FIG. 1B, the link controller 210 and the SD controller 220 may be integrated. The connection management circuit 260 may control a link to the host device 100. The connection management circuit 260 may perform the same operations as those of the link controller 210 of FIG. 1A. For example, the connection management circuit 260 may deactivate the pin corresponding to the data path among a plurality of pins of the SD controller 220, deactivate the switch on the data path, or reset or initialize the SD controller 220. The connection management circuit 260 may be used for the host device 100 to perform a relink (or reconnection) to the storage device 400 while maintaining a physical connection to the storage device 400.

FIG. 2 is a signaling diagram of a nonvolatile memory system according to an example embodiment of the inventive concept.

Referring to FIG. 2, in operation S110, a user configuration may be established between the host device 100 and the storage device 400. For example, the user of the storage device 400 may newly set a password of the storage device 400 or change a pre-set password for data encryption. According to example embodiments of the inventive concept, the user configuration may be established by software supporting a self encrypting drive (SED) function of the storage device 400. A more particular description of operation S110 will be made below with reference to FIG. 7.

In operation S120, the SD controller 220 may change a state of the SD controller 220 to the lock state from the unlock state. After completing the user configuration in operation S110, the user of the storage device 400 may disconnect the storage device 400 from the host device 100. The SD controller 220 may change a state of the SD controller 220 to the lock state in response to the power supply being cut off for security of user data. For example, when the user releases a physical connection to the host device 100, power supply from the host device 100 may be cut off. When power supply to the storage device 400 is cut off, the SD controller 220 may change a state of the SD controller 220 to the lock state The SD controller 220 may deactivate an access to the user data region by changing pointer information of the nonvolatile memory 300. A more particular description thereof will be made with reference to FIGS. 4A and 4B.

In operation S130, the host device 100 may be physically connected to the storage device 400. For example, when both the host device 100 and the storage device 400 support a USB interface, the physical connection may be performed based on a USB cable. When the host device 100 is connected to the storage device 400, the host device 100 may supply power to the storage device 400 through the power line to operate the storage device 400. For example, when the USB interface is a USB type-C interface, the storage device 400 may receive power from the host device 100 through a VBUS pin.

In operation S140, the SD controller 220 may receive a user input. The user input may be a password pre-set to unlock the storage device 400. Particularly, the user verification circuit 240 of the SD controller 220 may receive the user input through the host device 100 or the user input receiving circuit 270. For example, the host device 100 may receive the user input through an input/output (I/O) interface 110. The I/O interface 110 may include various I/O devices, such as, for example, a mouse, a keyboard, and a touchscreen. As another example, the user input receiving circuit 270 may be implemented by at least one of a dial, a jog dial, a biometrics module, an RFID module, and a keypad.

In operation S150, the SD controller 220 may perform user verification. The SD controller 220 may receive the user input from the host device 100 or the user input receiving circuit 270 and determine whether the user is an authorized user of the storage device 400 using the user verification circuit 240. The user verification circuit 240 may compare the previously-stored password to the received user input to determine if the received user input and the previously-stored password match.

In operation S160, the SD controller 220 may transition a state of the SD controller 220 to the unlock state from a lock state. When the pre-stored password matches the user input received in operation S150, it is determined that the user is an authorized user of the storage device 400, and the state of the SD controller 220 may be transitioned to the unlock state to permit an access to the user data region. For example, when the comparison result is a match, the user verification circuit 240 may activate an access to the user data region by changing pointer information of the nonvolatile memory 300. A more particular description thereof will be made with reference to FIGS. 4A and 4B. The user verification circuit 240 may change the pointer information and deliver a control signal to the relink trigger circuit 250.

In operation S170, a relink between the host device 100 and the storage device 400 may be performed. As described above, the relink does not indicate that a physical connection is released and then achieved again. That is, the relink may indicate that only the data path is temporarily deactivated and re-activated while power is continuously being supplied in a plug-in state instead of plug-out and then plug-in. The relink may be performed by the link controller 210 of FIG. 1A or the connection management circuit 260 of FIG. 1B.

According to an example embodiment of the inventive concept, when the storage device 400 includes the link controller 210 of FIG. 1A, the relink trigger circuit 250 of the SD controller 220 may transmit a trigger signal to the link controller 210. The link controller 210 may perform the relink by temporarily disabling the pin corresponding to the data path, temporarily deactivating the switch on the data path, or initializing the microprocessor (not shown) in response to reception of the trigger signal. According to another embodiment of the inventive concept, when the storage device 400 is implemented so as to include the SD controller 220 integrated with the link controller 210 as shown in FIG. 1B, the relink may be performed by controlling the connection management circuit 260. For example, in response to receiving the trigger signal from the relink trigger circuit 250, the connection management circuit 260 may perform the relink by temporarily disabling the pin corresponding to the data path or temporarily deactivating the switch on the data path in response to reception of the trigger signal from the relink trigger circuit 250.

In operation S180, the host device 100 may write and/or read data. When the relink is performed in operation S170, the host device 100 may re-recognize the storage device 400. However, because the pointer information has been changed in operation S160, the host device 100 may start booting in the user data region and access the user data region. Therefore, the host device 100 may request to read user data (CMD_READ) or request to write data in the user data region (CMD_WRITE).

Figure 3:
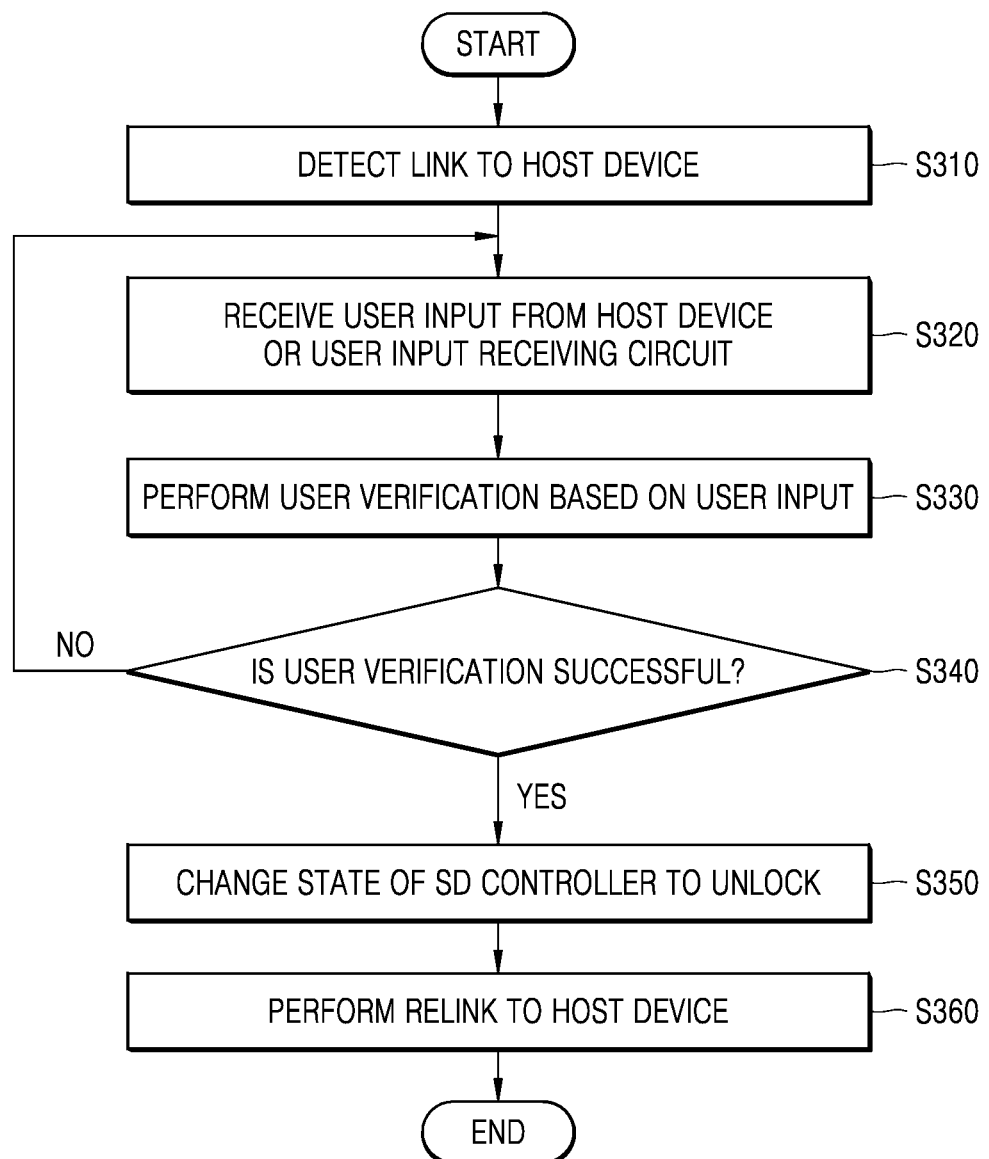
FIG. 3 is a flowchart of an operation of a memory controller, according to an example embodiment of the inventive concept.

FIG. 3 is a flowchart of an operation of a memory controller according to an example embodiment of the inventive concept.

Referring to FIG. 3, the SD controller 220 may detect a link to the host device 100 in operation S310. The host device 100 may be connected to the storage device 400 by a commonly supportable interface. For example, when both the host device 100 and the storage device 400 support a USB interface, the connection may be performed through a USB cable. The storage device 400 may receive power and transmit and receive data by being connected to the host device 100. According to example embodiments of the inventive concept, the SD controller 220 may change a state of the SD controller 220 to the lock state every time a physical connection is released, i.e., every time power supply is cut-off. For example, before detecting the link to the host device 100 in operation S310, the state of the SD controller 220 may correspond to a previously locked state.

The SD controller 220 may receive a user input from the host device 100 or the user input receiving circuit 270 in operation S320. The user input may be a password pre-set to for unlocking the nonvolatile memory 300. The SD controller 220 may perform user verification by comparing the previously-stored password to the received user input in operation S330. In operation S340, the SD controller 220 may determine whether the user verification is successful, based on the comparison result. For example, when the user input does not match the previously-stored password, the SD controller 220 may wait until a user input is received again. As another example, when the user input matches the previously-stored password, the SD controller 220 may change the state of the SD controller 220 from the lock state to the unlock state in operation S350.

The change to the unlock state may be achieved by changing, by the SD controller 220, the pointer information to a normal master boot record (MBR), and this will be described below with reference to FIGS. 4A and 4B. In operation S360, the SD controller 220 may perform a relink such that the host device 100 accesses the user data region according to the changed pointer information.

Figure 4A:
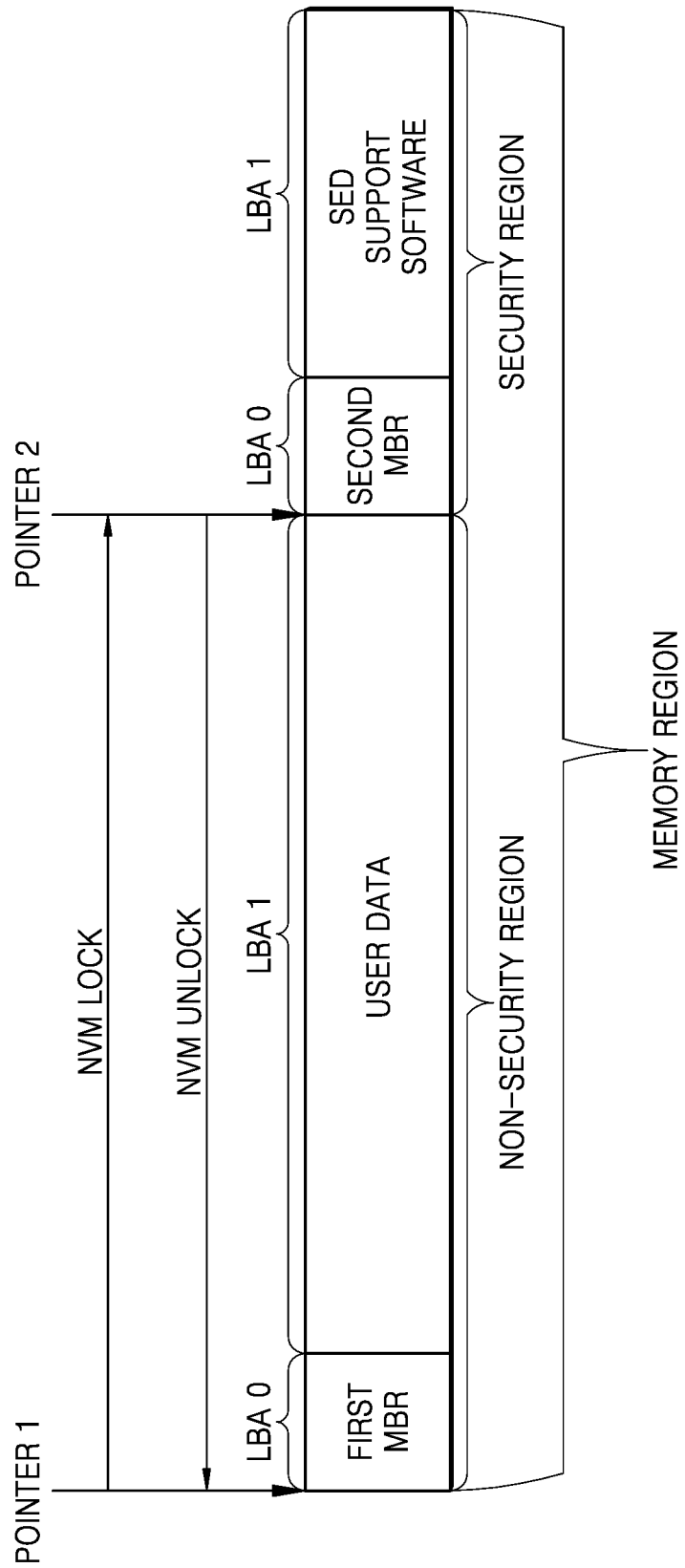
FIG. 4A illustrates a storage state of a nonvolatile memory device, according to an example embodiment of the inventive concept.
Figure 4B:
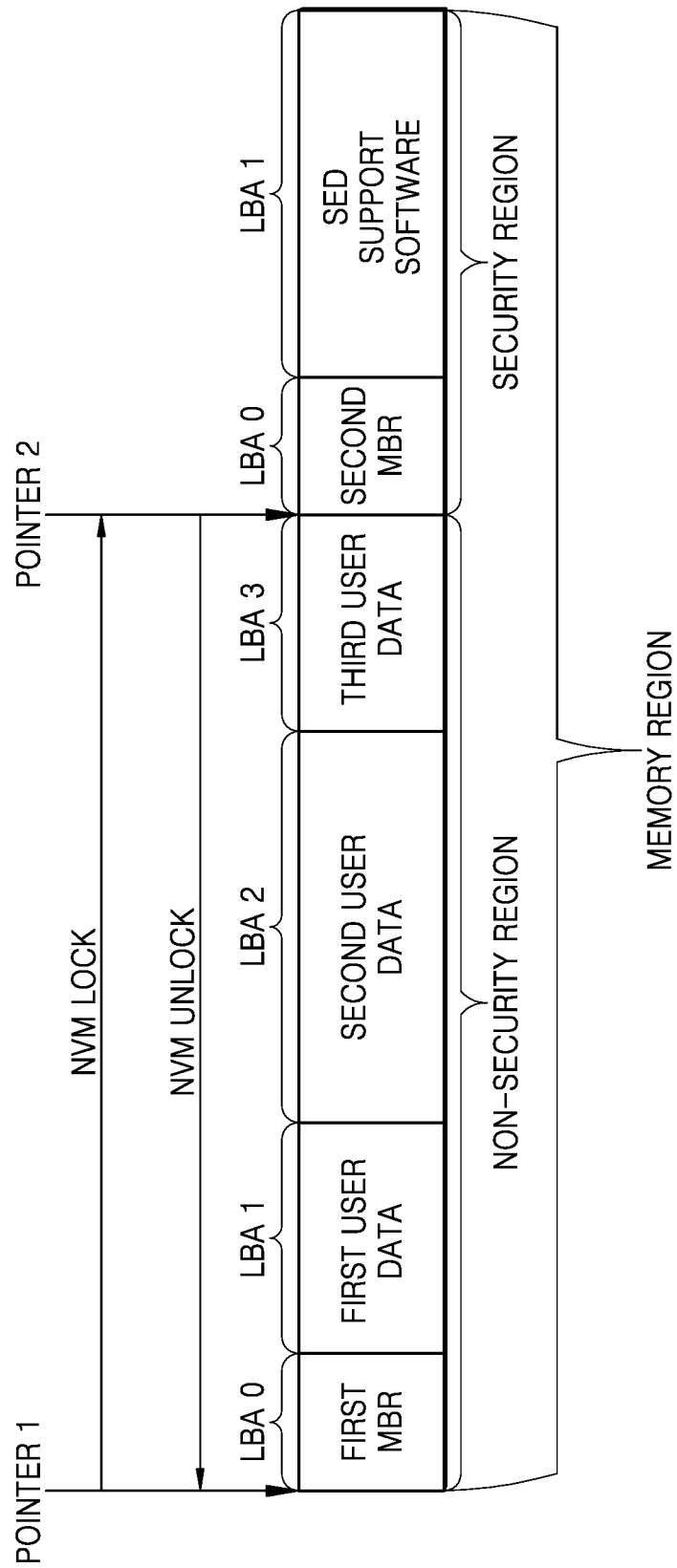
FIG. 4B illustrates a storage state of a nonvolatile memory device, according to another example embodiment of the inventive concept.

FIGS. 4A and 4B illustrate storage states of a nonvolatile memory device according to an example embodiment of the inventive concept.

According to example embodiments of the inventive concept, referring to FIG. 4A, a storage space of the nonvolatile memory 300 is illustrated. The storage space of the nonvolatile memory 300 is referred to as a memory region. The memory region may include a non-security region and a security region.

The non-security region may include a first MBR and user data. The non-security region is a region in which the user data is stored and may be referred to using terms such as user volume, user data region, and private region. The non-security region may be understood as a memory region accessible in a state in which security of the storage device is released (e.g., non-security state).

An MBR may include information including a location of partition, boot code for booting, and the like. The first MBR may be referred to as an operating system (OS) MBR. For example, when an operating system of the host device 100 is Windows, the first MBR may be an MBR loader. As another example, when the operating system of the host device 100 is Linux, the first MBR may be a Linux loader (LILO) or a grand unified bootloader (GRUB). Logical block addressing (LBA) may be a scheme for designating a location of a data block in the memory region. For example, a first data block may correspond to LBA 0, and a second data block may correspond to LBA 1. Therefore, it may be understood that the first MBR is stored in an LBA 0 region. For example, LBA 1 may be a region in which the user data is stored, and LBA 0 may be a region in which MBR data is stored.

According to example embodiments of the inventive concept, the security region may include regions in which a second MBR and SED support software are stored. The security region may be understood as a memory region accessible in a state in which security of the storage device 400 is maintained (e.g., a security state). As in the non-security region, LBA may be the scheme for designating a location of a data block in the security region of the memory region. For example, in the security region, LBA 1 may be the region in which the SED support software is stored, and LBA 0 may be the region in which the second MBR data is stored.

The second MBR may be referred to as various terms such as a shadow MBR (SMBR) and a fake MBR. The second MBR may correspond to an MBR for allowing the host device 100 to forcedly start booting in a region regardless of the user data when an access to the non-security region is not available because security of the storage device 400 is not released. According to example embodiments of the inventive concept, a firmware file may be stored in LBA 1 in the security region. This is to guide the user to install software supporting release of security.

According to example embodiments of the inventive concept, the SD controller 220 may activate pointer 1. When pointer 1 is activated, the host device 100 may be connected to the storage device 400 and start booting by using the first MBR in the non-security region. When starting booting through the first MBR, the host device 100 may access the region in which the user data is stored.

According to example embodiments of the inventive concept, the SD controller 220 may activate pointer 2. When pointer 2 is activated, the host device 100 may be connected to the storage device 400 and start booting by using the second MBR in the security region. When starting booting through the second MBR, the host device 100 may not access the region in which the user data is stored, and a region accessible by the host device 100 may be only the region in which the SED support software is stored. That is, activation of pointer 2 may indicate that the state of the SD controller 220 corresponds to the lock state because power supplied to the storage device 400 is blocked.

In some embodiments, the SD controller 220 may change the pointer information such that the MBR information indicates an operating state (OS) MBR, thereby causing the SD controller 220 to change to the unlock state. The OS MBR may be stored in the non-security region of the memory region. In addition, the SD controller 220 may change the pointer information to the shadow MBR (SMBR), thereby causing the SD controller 220 to change to the lock state. The SMBR may be stored in the security region of the memory region.

According to example embodiments of the inventive concept, FIG. 4B shows a case where a plurality of users use a storage region. An LBA 1 region may be a region in which data of a first user is stored, an LBA 2 region may be a region in which data of a second user is stored, and an LBA 3 region may be a region in which data of a third user is stored. When a user input is received from the host device 100 or the user input receiving circuit 270, the SD controller may compare whether the received user input matches a pre-stored password. For example, it may be assumed that the first user has set a first password, a second user has set a second password, and a third user has set a third password. In this case, the SD controller may compare the received user input to all of the first to third passwords. When the received user input does not match any of the first to third passwords, the storage device 400 may maintain security. When the received user input matches one of the first to third passwords, a start address of a user data region corresponding to the matched password in partition information of a first MBR region may be referred to. For example, when the user input matches the second password, the SD controller 220 may identify a start address of LBA 2 from the partition information in the first MBR. In this case, the LBA 1 region for the first user and the LBA 3 region for the third user may not be accessible by the host device 100. This is because the host device 100 may access only an address of LBA 1 referred to from the partition information in the first MBR.

Figure 5:
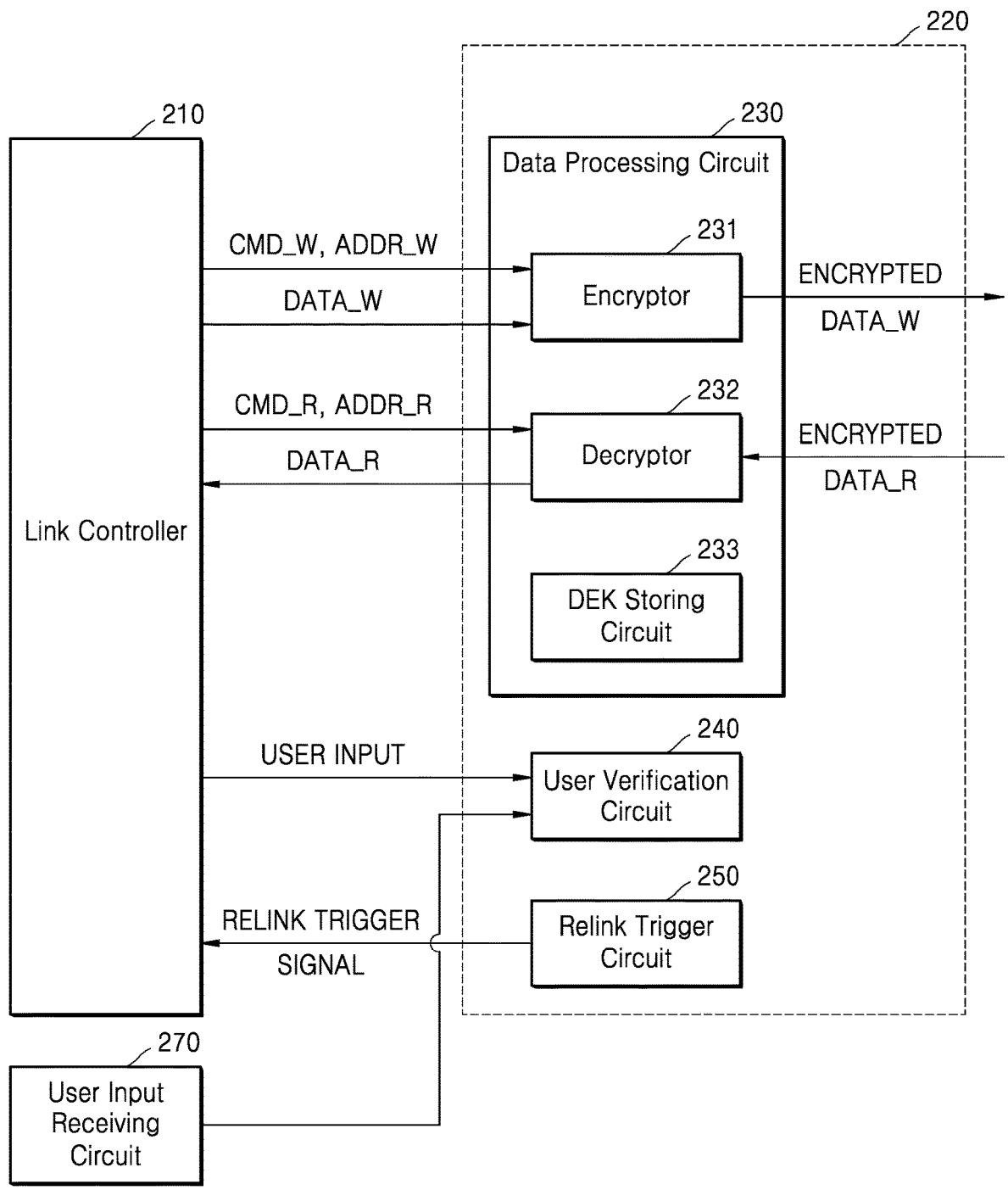
FIG. 5 is a block diagram of a storage device, according to an example embodiment of the inventive concept.

FIG. 5 is a block diagram of a storage device according to an example embodiment of the inventive concept.

Hereinafter, the storage device 400 in which the link controller 210 and the SD controller 220 are separately implemented is illustrated. However, the present embodiment is not limited thereto and may also be applied to the storage device 400 in which the SD controller 220 is integrated with the link controller 210 as shown in FIG. 1B.

Referring to FIG. 5, the data processing circuit 230 may include an encryptor 231, a decryptor 232, and a data encrypting key (DEK) storing circuit 233.

The encryptor 231 may encrypt write data DATA_W. According to an example embodiment of the inventive concept, when the SD controller 220 is in the lock state, a write command CMD_W may be delivered to the encryptor 231 from the link controller 210, along with the write data DATA_W and the designated write address ADDR_W. In this case, the SD controller 220 is not accessible to the non-security region of the nonvolatile memory 300, and thus, data may not be written. According to another example embodiment of the inventive concept, when the SD controller 220 is in the unlock state, the write command CMD_W may be delivered. In the unlock state, the encryptor 231 is accessible to the non-security region, and thus, the write command CMD_W may be performed. The encryptor 231 may not store the write data DATA_W in a designated address ADDR as it is, but may encrypt the write data DATA_W. The encryptor 231 may perform the encryption by using a DEK value requested and received from the DEK storing circuit 233. After the encryption is finished, the encryptor 231 may store encrypted write data ENCRYPTED DATA_W in the designated write address ADDR_W.

The decryptor 232 may decrypt encrypted read data ENCRYPTED DATA_R. According to an example embodiment of the inventive concept, when a state of the SD controller 220 is the lock state, a read command CMD_R may be delivered to the decryptor 232 from the link controller 210, along with the designated read address ADDR_R. In this case, the SD controller 220 is not accessible to the non-security region of the nonvolatile memory 300, and thus, data may not be read. According to another example embodiment of the inventive concept, when the SD controller 220 is in the unlock state, the read command CMD_R may be delivered to the decryptor 232. In the unlock state, the decryptor 232 is accessible to the non-security region, and thus, the read command CMD_R may be performed. The decryptor 232 may read data stored in a designated read address ADDR_R The read data may be the encrypted read data ENCRYPTED DATA_R. The decryptor 232 may perform decryption by using a DEK value received from the DEK storing circuit 233. After the decryption is finished, the decryptor 232 may deliver decrypted read data DATA_R to the link controller 210 so that the link controller 210 outputs the decrypted read data DATA_R to the host device 100.

The DEK storing circuit 233 may store a key value to be used to encrypt and decrypt data. According to an example embodiment of the inventive concept, the DEK may correspond to a unique value of the storage device 400. For example, the DEK may be generated based on a global unique identifier (GUID) of the storage device 400.

Although it has been described in the embodiments described above that a user input received from the host device or the user input receiving circuit 270 is used for user verification and the DEK value is a unique value for each storage device 400, the embodiments are not limited thereto. According to example embodiments of the inventive concept, the DEK value may be additionally encrypted based on the preset password. In this case, the user input may be used both to verify, by the user verification circuit 240, whether the user is an authorized user and to obtain the DEK value. By additionally encrypting the DEK value, an external intruder (e.g., hacker) may be prevented from obtaining the DEK value and decrypting user data.

Figure 6:
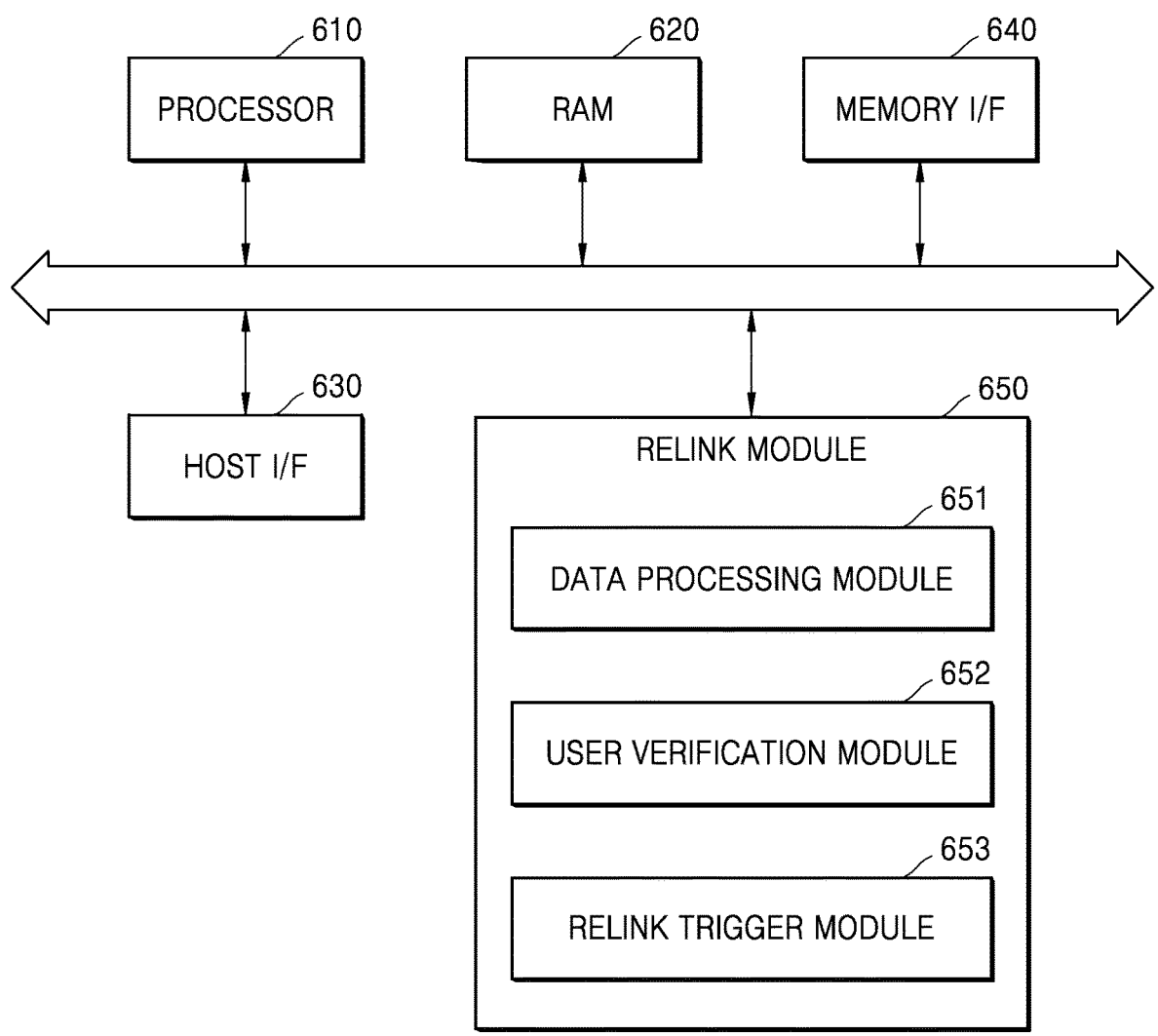
FIG. 6 is a block diagram of an interface between a host device and a storage device, according to an example embodiment of the inventive concept.

FIG. 6 is a block diagram of an interface between a host device and a storage device according to an example embodiment of the inventive concept.

Referring to FIG. 6, the SD controller 220 may include a processor 610, RAM 620, a host interface 630, a memory interface 640, and a relink module 650.

The processor 610 may include a central processing unit or a microprocessor. The processor 610 may control a general operation of the SD controller 220. For example, the processor 610 may be configured to execute software or firmware for controlling the SD controller 220, and the software or firmware may be loaded on the RAM 620. For example, the RAM 620 may be configured to access and store data and information and computer program instructions (e.g., software or firmware) that are executed by the processor 610. The RAM 620 may be used as an operating memory, a cache memory, or a buffer memory of the processor 610. Write data to be written on a memory device may be temporarily stored in the RAM 620, and in addition, read data read from the memory device may be temporarily stored in the RAM 620.

The host interface 630 is interfaced with the host device 100 and receives a request for a memory operation from the host device 100. In addition, the memory interface 640 may provide an interface between the SD controller 220 and a memory device (not shown). For example, write data and read data may be transmitted and received to and from the memory device through the memory interface 640. In addition, the memory interface 640 may provide a command and an address to the memory device, and in addition, may receive various kinds of information from the memory device and provide the received information to the inside of the SD controller 220.

According to an example embodiment of the inventive concept, the relink module 650 may perform various operations related to a relink according to the example embodiments described above based on a software scheme. The relink module 650 may include a data processing module 651, a user verification module 652, and a relink trigger module 653. When an operation according to example embodiments of the inventive concept is performed based on a software scheme, each of the data processing module 651, the user verification module 652, and the relink trigger module 653 may include programs executable by the processor 610, and the programs may be loaded on the RAM 620 and executed by the processor 610.

Figure 7:
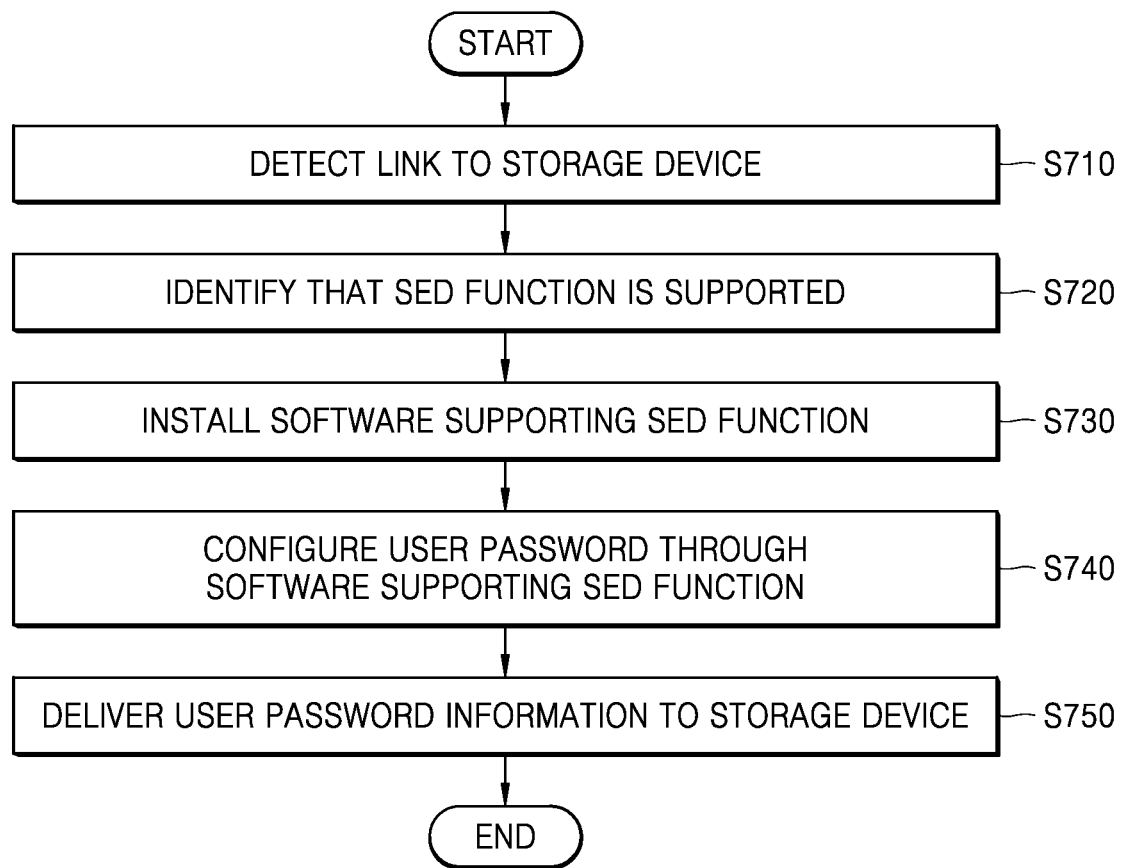
FIG. 7 is a flowchart of an operation of a host device, according to an example embodiment of the inventive concept.

FIG. 7 is a flowchart of an operation of host device according to an example embodiment of the inventive concept.

Referring to FIG. 7, the host device 100 may detect a link to the storage device 400 in operation S710. Operation S710 may be described with reference to the descriptions of operation S130 of FIG. 2 and operation S310 of FIG. 3. In operation S720, the host device 100 may identify that the storage device 400 supports an SED function. For example, the host device may receive configuration information of the storage device 400 and check whether the storage device 400 supports the SED function based on an identifier indicating whether SED is supported.

According to example embodiments of the inventive concept, when the storage device 400 supports the SED, communication may be performed based on a trusted computing group (TCG) protocol. The TCG protocol is a communication standard supporting the SED and relates to a method of partitioning a user region in the storage device 400 and a method of changing the lock state and the unlock state in the storage device 400. For example, when the storage device 400 supports the SED, a shadow MBR (SMBR) may be generated based on the TCG protocol In operation S730, the host device 100 may install software supporting the SED function. According to an example embodiment of the inventive concept, although the host device 100 has identified that the storage device 400 supports the SED function, when the SED function is deactivated in the storage device 400, the host device 100 may display a pop-up window for presenting installation of the software or allow an installation file of the software to be automatically executed. The execution of the installation file and/or the installation of the software may be performed by the processor 610. In operation S740, the host device 100 may configure a user password through the software supporting the SED function. When the software is executed, an input of a password for activating the SED function may be requested, and the host device 100 may deliver an input password to the storage device 400 in operation S750. The delivered password may be stored in the user verification circuit 240. The user verification circuit 240 may control the lock state of the SD controller 220 by comparing the user's input password to the stored password every time the storage device 400 is plugged in the host device 100.

Figure 8:
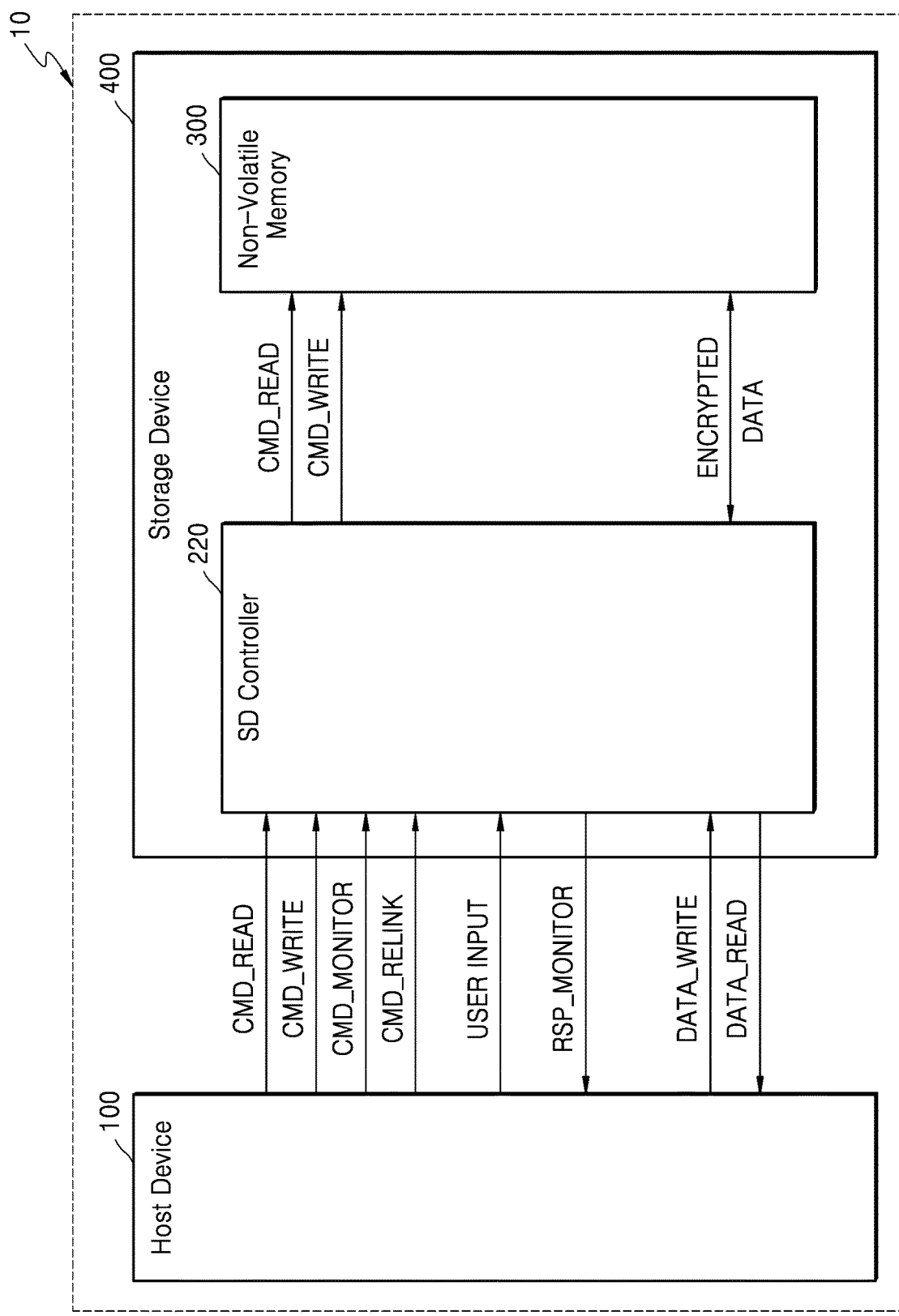
FIG. 8 is a block diagram of a nonvolatile memory system, according to an example embodiment of the inventive concept.

FIG. 8 is a block diagram of a nonvolatile memory system according to an example embodiment of the inventive concept. The description made with reference to FIGS. 1A and 1B may not be repeated herein.

Although not illustrated in FIG. 8, the SD controller 220 may include the data processing circuit 230, the user verification circuit 240, the relink trigger circuit 250, and the user input receiving circuit 270, as discussed in connection with FIGS. 1A and 1B. The SD controller 220 of FIG. 8 may not include the link controller 210 of FIG. 1A or the connection management circuit 260 of FIG. 1B according to example embodiments of the inventive concept.

Referring to FIG. 8, the host device 100 may transmit a monitoring signal CMD_MONITOR for identifying a state of the SD controller 220. The SD controller 220 of FIG. 8 may be dependent on a command received from the outside (e.g., the host device 100). The host device 100 may periodically transmit the monitoring signal CMD_MONITOR to the SD controller 220. For example, when a state of the SD controller 220 is changed from the lock state to the unlock state, an access to a user data region may be performed according to changed pointer 1 where a relink is to be performed. However, because the SD controller 220 and the nonvolatile memory 300 are passive devices, it is needed to periodically check whether the state of the SD controller 220 has been changed. Passive devices may indicate devices capable of transmitting a response only when a command is received, i.e., devices which cannot independently first transmit a signal.

The SD controller 220 may transmit a response signal RSP_MONITOR to the host device 100 in response to the monitoring signal CMD_MONITOR periodically received by the SD controller 220. The response signal RSP_MONITOR may indicate, for example, whether the SD controller 220 is in the unlock state or the lock state. Because the host device 100 cannot be aware of when the state of the SD controller 220 is in the unlock state, the host device 100 may continue to periodically transmit the monitoring signal CMD_MONITOR to the SD controller 220 until the SD controller 220 transmits a response signal RSP_MONITOR indicating the unlock state. The periodic transmission and reception of the monitoring signal CMD_MONITOR and the response signal RSP_MONITOR may act as a load to the host device 100 and the SD controller 220, respectively, thereby degrading the performance of the entire memory system.

According to example embodiments of the inventive concept, the host device 100 may transmit, to the SD controller 220, a signal CMD_RELINK for requesting to perform a relink. For example, while the host device 100 is periodically performing monitoring, a response signal RSP_MONITOR indicating the unlock state may be received. The host device 100 may access the user data region according to a changed pointer only when a relink is performed. Therefore, the host device 100 may transmit, to the SD controller 220, a signal CMD_RELINK for requesting to perform a relink. When the host device 100 transmits a signal CMD_RELINK every time, a delay in an access to the nonvolatile memory 300 may occur. This is because, even when the SD controller 220 is changed to the unlock state, the SD controller 220 is still identified as the lock state until the host device 100 transmits the monitoring signal CMD_MONITOR at a next period and the SD controller 220 transmits a response signal RSP_MONITOR in response to the monitoring signal CMD_MONITOR. In addition, because the host device 100 transmits the signal CMD_RELINK again after receiving the response signal RSP_MONITOR, a delay of a time taken to deliver the signal CMD_RELINK may additionally occur.

Figure 9:
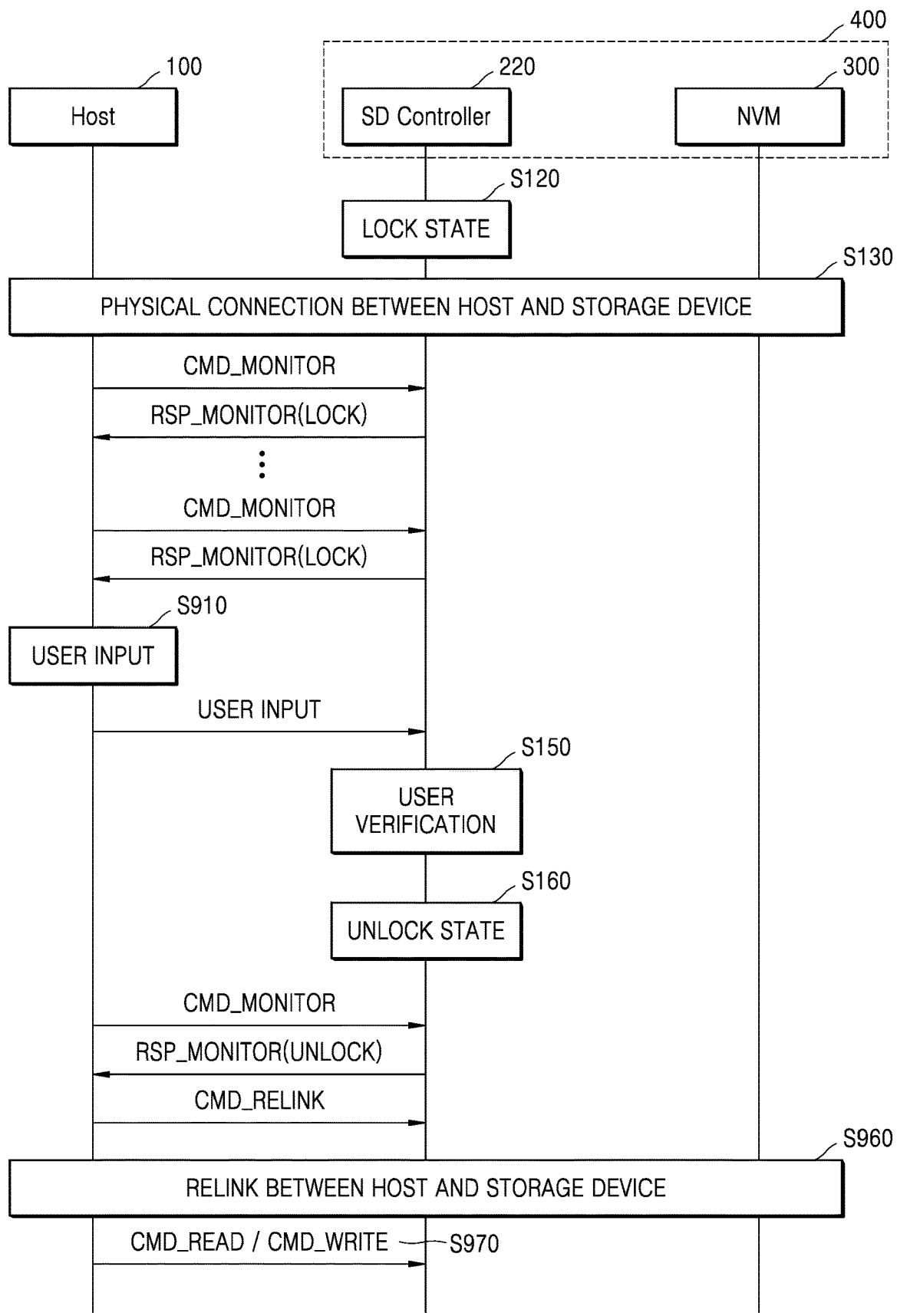
FIG. 9 is a signaling diagram of a nonvolatile memory system, according to an example embodiment of the inventive concept.

FIG. 9 is a signaling diagram of a nonvolatile memory system according to an example embodiment of the inventive concept. The description made with reference to FIG. 2 may not be repeated herein.

Referring to FIG. 9, the host device 100 may transmit, at regular periodic intervals, the monitoring signal CMD_MONITOR for checking whether the SD controller 220 is in the lock state. In response to receiving the monitoring signal CMD_MONITOR at regular periodic intervals, the SD controller 220 transmits a response signal RSP_MONITOR indicating a state of the SD controller 220.

In addition, referring to operation S910, a user input to unlock the nonvolatile memory 300 may be input only through the host device 100. This is because, in some embodiments, the SD controller 220 may not include a separate user input receiving circuit 270 unlike FIGS. 1A and 1B. Therefore, receiving the user input may be dependent on the host device 100.

In addition, although the SD controller 220 is changed to the unlock state in operation S160, the host device 100 may still identify the SD controller 220 as being in the lock state. Thereafter, when receiving a response signal RSP_MONITOR (UNLOCK) in response to the monitoring signal CMD_MONITOR periodically transmitted, the host device 100 may recognize the state change of the SD controller 220. For example, the host device 100 may not identify an SD controller 220 as being in an unlock state until the host device 100 has received the response signal RSP_MONITOR (UNLOCK) from the SD controller 220, indicating that the SD controller 220 is in an unlock state. Thus, there may occur a delay time from when the SD controller 220 is actually unlocked to when the host device 100 recognizes the unlock.

In addition, the host device 100 may transmit a command for requesting to perform a relink, to recognize a user data region. The relink may be delayed by a time taken to transmit a signal CMD_RELINK and a time taken for the SD controller 220 to receive the signal CMD_RELINK and start the relink.

When referring to the description made with reference to FIGS. 8 and 9 together with the description made with reference to FIGS. 1A and 2 according to example embodiments of the inventive concept, the effects of the inventive concept could be clearly understood.

Figure 10:
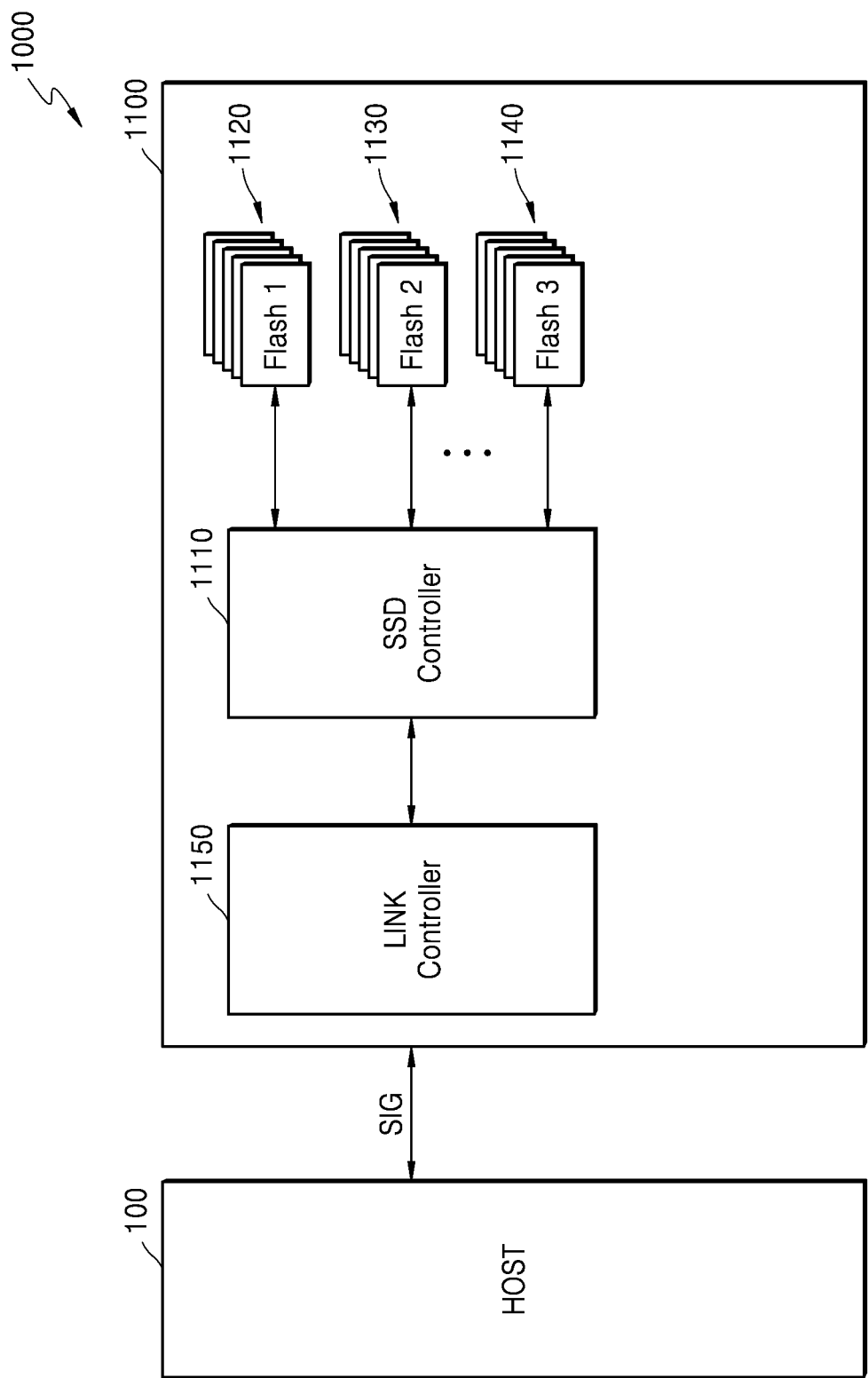
FIG. 10 is a block diagram of an example in which a memory device according to an example embodiment of the inventive concept is applied to a solid state drive (SSD) system.

FIG. 10 is a block diagram of an example in which a memory device according to an example embodiment of the inventive concept is applied to an SSD system.

Referring to FIG. 10, an SSD system 1000 may include the host device 100 and an SSD 1100. The SSD 1100 transmits and receives a signal to and from the host device 100 through a signal connector and receives power through a power connector. The SSD 1100 may include an SSD controller 1110, a plurality of memory devices 1120 to 1140, and a link controller 1150. Herein, the SSD controller 1110 and the link controller 1150 may be implemented by using the embodiments shown in FIGS. 1A to 9. For example, the SSD controller 1110 (also referred to as a memory controller) and the link controller 1150 may correspond to the SD controller 220 and the link controller 210, respectively. Accordingly, the SSD 1100 may not perform a relink based on a command of the host device 100 but may independently perform a relink even without receiving a command from the host device 100. In addition, the SSD 1100 may not receive a monitoring command from host device 100 and may not transmit a response signal in response to the monitoring command, and thus, a load of a memory system may be reduced. In addition, because the SSD 1100 does not receive a monitoring command or a command indicating a relink from host device 100, the SSD 1100 may independently perform a relink even when the host device 100 does not support a monitoring command or a command indicating a relink, and thus, the dependency on the host device 100 or an operating system of the host device 100 may be reduced, and the SSD 1100 may be used for various types of host devices. For example, the host device 100 may be configured to bypass transmission of a monitoring command for identifying the state of the SSD controller 1110 and a command indicating a relink in response to a change of the state of the SSD controller 1110 to an unlock state. In addition, when a lock state of the SSD 1100 is released, the SSD 1100 independently performs a relink, and thus, the relink may be quickly performed without a time delay required to transmit and receive a monitoring command or a command indicating a relink.

The memory device according to the embodiments of the inventive concept may be mounted on or applied to not only the SSD 1100 but also a memory card system, a computing system, a universal flash storage (UFS), and the like. In addition, the operating method of a memory device, according to the embodiments of the inventive concept, may be applied to various types of electronic systems having a nonvolatile memory embedded therein.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

While the inventive concept has been particularly shown and described with reference to embodiments thereof, it will be understood that various changes in form and details may be made therein without departing from the spirit and scope of the following claims.

What is claimed is:

1. A nonvolatile memory system comprising a host device and a storage device connected to the host device through a physical cable including a power line and a data line, the storage device comprising:
    a nonvolatile memory;
    a link controller configured to temporarily deactivate the data line while receiving power from the host device through the power line; and
    a memory controller comprising a user verification circuit configured to verify a user of the storage device and change a state of the memory controller according to a verification result, a relink trigger circuit configured to control the link controller based on the state change of the memory controller, and a data processing circuit configured to encrypt and decrypt data,
    wherein the link controller is further configured to temporarily deactivate the data line while receiving the power from the host device through the power line in response to the state of the memory controller changing from a lock state to an unlock state, and
    wherein the host device is configured to bypass transmitting a monitoring command for identifying the state of the memory controller in the storage device and a command indicating a relink in response to a change of the state of the memory controller to the unlock state.

2. The nonvolatile memory system of claim 1, wherein the nonvolatile memory comprises a first region accessible by the host device in the unlock state and a second region accessible by the host device in the lock state.

3. The nonvolatile memory system of claim 2, wherein the storage device further comprises a user input receiving circuit configured to receive a user input for unlocking the memory controller, and
    wherein the memory controller is configured to change the state of the memory controller to the lock state in response to power-off of the storage device and to finish user verification and change the state of the memory controller from the lock state to the unlock state when a value received from the host device or the user input receiving circuit matches a value pre-stored in the user verification circuit.

4. The nonvolatile memory system of claim 2, wherein the memory controller is further configured to change the state of the memory controller to the lock state by changing pointer information such that master boot record (MBR) information indicates a second MBR included in the second region and to change the state of the memory controller to the unlock state by changing the pointer information such that the MBR information indicates a first MBR included in the first region,
    wherein the first MBR corresponds to an operating system (OS) MBR, and
    wherein the second MBR corresponds to a shadow MBR (SMBR).

5. The nonvolatile memory system of claim 2, wherein the first region further comprises a plurality of sub-regions respectively corresponding to a plurality of users, and
    wherein the plurality of users are capable of accessing only a corresponding sub-region for which user verification is finished, from among the plurality of sub-regions.

6. The nonvolatile memory system of claim 1, wherein the physical cable comprises a cable for a hot-pluggable interface, and
    wherein the interface comprises at least one of a universal serial bus (USB) interface, a serial advanced technology attachment (SATA) interface, a parallel advanced technology attachment (PATA) interface, a small computer system interface (SCSI) interface, or a serial attached SCSI (SAS) interface.

7. The nonvolatile memory system of claim 1, wherein the user verification circuit is further configured to transmit a control signal to the relink trigger circuit when the user verification is successful, and
    wherein the relink trigger circuit is further configured to transmit a relink trigger signal to the link controller in response to receiving the control signal.

8. The nonvolatile memory system of claim 7,
wherein the link controller is further configured to receive the relink trigger signal before receiving a command indicating a relink from the host device and temporarily deactivate the data line while the power line is activated, in response to receiving the relink trigger signal.

9. The nonvolatile memory system of claim 1, wherein the link controller and the memory controller are on the same semiconductor substrate.

10. A storage device comprising:
a nonvolatile memory;
a user input receiving circuit;
a link controller configured to deactivate a data line through which the storage device is physically connected to a host device; and
a memory controller configured to perform user verification by comparing a pre-stored user input value with a user input value received from the host device or the user input receiving circuit, change a state of the memory controller based on a user verification result of the user verification, and transmit a trigger signal to the link controller in response to the state of the memory controller changing from a lock state to an unlock state,
wherein, based on the trigger signal, the link controller is further configured to deactivate the data line while receiving power from the host device, and
wherein the storage device is configured to bypass receiving, from the host device, a monitoring command for identifying the state of the memory controller and a command indicating deactivation of the data line in response to a change of the state of the memory controller to the unlock state.

11. The storage device of claim 10, wherein the link controller is further configured to receive the trigger signal from the memory controller before receiving, from the host device, a command indicating that the data line is temporarily deactivated and temporarily deactivate, based on the trigger signal, the data line while receiving power from the host device.

12. The storage device of claim 10, wherein the link controller and the memory controller are on the same semiconductor substrate.

13. The storage device of claim 10, wherein the memory controller is further configured to change the state of the memory controller from the lock state to the unlock state when a user verification result indicates a match of the compared values and transmit the trigger signal to the link controller.

14. The storage device of claim 13, wherein the memory controller is further configured to change the state of the memory controller to the unlock state by changing pointer information such that the pointer information indicates a first master boot record (MBR) included in a first region.

15. The storage device of claim 10, wherein the memory controller is further configured to identify that the physical connection to the host device is released and change the state of the memory controller to the lock state in response to identifying that the physical connection to the host device is released.

16. The storage device of claim 10,
wherein the physical connection is generated based on a hot-pluggable interface, and
wherein the interface comprises at least one of a universal serial bus (USB) interface, a serial advanced technology attachment (SATA) interface, a parallel advanced technology attachment (PATA) interface, a small computer system interface (SCSI) interface, or a serial attached SCSI (SAS) interface.

17. An operating method of a storage device comprising a nonvolatile memory, a link controller, and a memory controller, the operating method comprising:
detecting a physical connection between the storage device and a host device;
receiving a user input from the host device or a user input receiving circuit in the storage device;
performing user verification based on the received user input;
changing a state of the memory controller to an unlock state when user verification is successful; and
performing a relink to the host device in response to the changing the state of the memory controller to the unlock state,
wherein the performing of the relink to the host device comprises temporarily deactivating a data line connected to the host device while receiving power from the host device in response to the state of the memory controller changing from the lock state to the unlock state, and
wherein the host device is configured to bypass transmitting a monitoring command for identifying the state of the memory controller in the storage device and a command indicating a relink in response to a change of the state of the memory controller to the unlock state.

* * * * *